United States Patent [19]

Jacobson

[11] Patent Number: 4,695,832
[45] Date of Patent: Sep. 22, 1987

[54] ANALOG COLOR SELECTOR

[75] Inventor: Dov Jacobson, Staten Island, N.Y.

[73] Assignee: Time Video Information Services, Inc., New York, N.Y.

[21] Appl. No.: 549,564

[22] Filed: Nov. 7, 1983

[51] Int. Cl.⁴ .............................................. G09G 1/00
[52] U.S. Cl. .................................. 340/709; 340/703; 340/723; 200/6 A
[58] Field of Search ................... 340/703, 709, 365 R, 340/701, 723; 200/6 A, 11 R

[56] References Cited

U.S. PATENT DOCUMENTS

| | | |
|---|---|---|
| 1,613,337 | 1/1927 | Weller . |
| 3,942,148 | 3/1976 | Nishioka ........................ 200/6 A X |
| 4,068,847 | 1/1978 | Lukkarila et al. ................ 273/85 R |
| 4,091,234 | 5/1978 | Bristow ...................... 340/365 R X |
| 4,092,532 | 5/1978 | Hayes ................................... 250/221 |
| 4,139,838 | 2/1979 | Inose et al. .......................... 340/703 |
| 4,155,095 | 5/1979 | Kirschner ............................. 358/82 |
| 4,200,867 | 4/1980 | Hill ....................................... 340/703 |
| 4,229,760 | 10/1980 | Avery ................................... 358/22 |
| 4,232,311 | 11/1980 | Agneta .................................. 340/703 |
| 4,303,986 | 12/1981 | Lans ..................................... 364/900 |
| 4,342,029 | 7/1982 | Hofmanis et al. .................... 340/703 |
| 4,524,421 | 6/1985 | Searby et al. .................... 340/703 X |
| 4,536,746 | 8/1985 | Gobeli ............................. 200/6 A X |

OTHER PUBLICATIONS

Foley et al, Fundamentals of Interactive Computer Graphics, 1982, pp. 617–618, 621–622.
Brochure of SAC® Service Accessories Corporation entitled "GP-6-3D, Graf/Pen Sonic Digitizer with Intelligent Graphics Display", undated.
Solsky, PC Magazine, "Computing in 3-D", Jun. 1983, pp. 350–358 Munsell; A Grammar of Color, "A Basic Treatise on the Color System of Albert H. Munsell, 1969.
Ostwald, Colour Science, Part I, 1931.
Ostwald, Colour Science, Part II, 1933.
Herot, et al., "One-Point Touch Input of Vector Information for Computer Displays", Computer Graphics: A Quarterly Report of SIGGRAPH-ACM, vol. 12, No. 3, Aug. 1978, pp. 210–216.

Primary Examiner—Marshall M. Curtis
Attorney, Agent, or Firm—Wayne M. Kennard

[57] ABSTRACT

An apparatus is disclosed with which a graphics designer can select an exact color to be shown on a video display device. The apparatus includes a control element movable in a region having at least two geometrical dimensions, each position in the region corresponding to a different color. If the region is only two-dimensional, the color element position defines two of the three independent variables needed to define the desired color, and the third is controlled independently.

13 Claims, 3 Drawing Figures

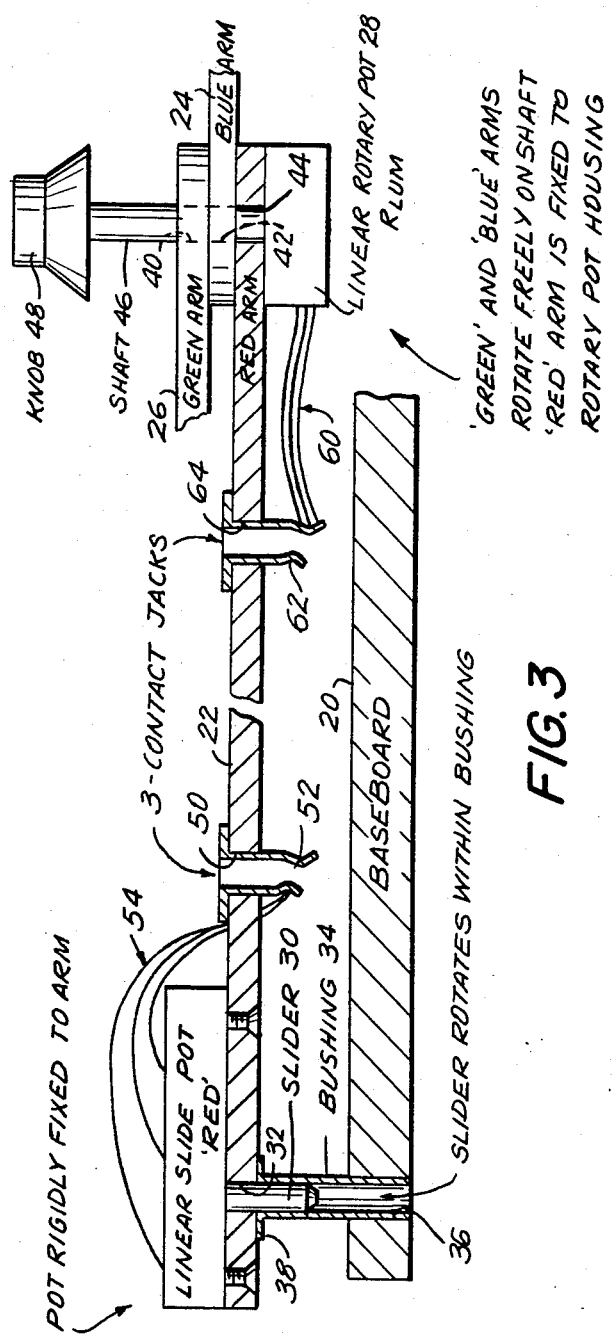

ANALOG COLOR SELECTOR

BACKGROUND OF THE INVENTION

The technical field to which the present invention pertains is means by which a computer graphics designer can select the color to be given to a specific part of a graphics display.

With state-of-the-art color monitors and graphics software, a graphics designer can choose from thousands or even millions of colors in creating a graphics display. This number of colors allows the designer tremendous versatility, but presents a problem not encountered with simpler systems in which only a small number of colors (e,g., eight) is available. A palette comprising only a few colors can be displayed along one edge of the screen on which the designer is composing the display, as is done, for example, in U.S. Pat. No. 4,232,311, issued Nov. 4, 1980 to Roi D. Agneta, for "Color Display Apparatus". This expedient is clearly not practical, however, with a palette of even a few dozen colors. Alternatively, the palette can be displayed on the entire screen, permitting use of a larger number of colors, but requiring the designer to select the color and enter the choice, then to inspect the scene with the selected color, and then to repeat the process as many times as may be necessary to obtain the desired effect. The designer cannot view the color in the scene while selecting the color. This method is cumbersome and time-consuming, the more so because, with a large palette, the designer often finds it necessary to try several colors before indentifying exactly the right one.

Anoher system uses a control to select the value of one color characteristic at a time, viz., hue, saturation or intensity, the characteristic to be varied being selected by means of an entry via a digital keyboard. This increases the number of colors the designer can choose from, assuming the editing machine's software is able to handle a large palette, but the designer still can only select a plane of colors from the so-called color solid at once rather than a single color, because only one characteristic can be varied at once.

It is therefore the principal object of the invention to provide a convenient, simple-to-use apparatus for selecting the color of an element of a computer graphics display.

Another object of the invention is to provide such an apparatus adapted to be connected to the monitor on which the display appears, or to a computer controlling the monitor, or both, in such a manner as to eliminate the necessity for the designer to enter the color choice via a keyboard.

Another object of the invention is to provide such an apparatus comprising an analog model of at least a portion of the so-called color solid, to enable the designer to select any color the monitor can display and not only one of a relatively small number of colors provided by the software developer.

Still another object of the invention is to provide such an apparatus capable of producing signals to control a monitor to change the displayed color continuously and substantially instantaneously.

SUMMARY OF THE INVENTION

The invention is an apparatus comprising a control element to be manipulated by the designer, movable continuously throughout a predetermined region having at least two geometric dimensions, and a device for monitoring the position of the control element in that region and for continuously generating a set of electrical signals that collectively represent the control element's instantaneous position. (The reference to "two geometric dimensions" is not to be taken as limiting the region to one having a flat surface; throughout the specification and claims, the term "two geometric dimensions" is used for convenience to mean any surface an exact location on which can only be denoted by means of at least two coordinates. Also, "region" as used in the specification and claims includes mathematical as well as physical regions.) The signals are preferably analog, in which case they can be applied, either directly or if necessary after intermediate processing, to the color gun controls of a color monitor or other video display unit. Preferably, however, each analog signal is changed to digital form by a suitable analog-to-digital converter (hereinafter "ADC") for application to appropriate input ports of a computer controlling the monitor.

Preferably, the position of the control element determines the hue and the intensity, or the hue and the saturation, of the color to be displayed. The third variable is most simply determined by means of an independent control, although it is also within the scope of the invention to make the control element movable in three dimensions, i.e., with three degrees of freedom, to eliminate the need for an independent control and to make use of the color selector as simple as possible.

According to one preferred embodiment, the control element is a knob connected by means of rods to the slides of three linear poentiometers that are spaced equiangularly about a circular area that serves as the two-dimensional region mentioned. The position of the knob in the circular area determines the voltages at the terminals of the potentiometers. These voltages are then preferably converted by ADC's to digital signals, which are analyzed to determine the proper signals to be applied to the monitor to produce the hue and saturation (or the hue and the intensity) corresponding to the knob position. The knob is preferably also secured to the shaft of a rotary potentiometer, whose terminal voltages are used to control the third color variable as a function of rotation of the knob. The rotary potentiometer is free to move with the knob in the circular area, the potentiometer leads being fastened as a matter of convenience to the rods to prevent tangling.

These and other features and advantages of the invention will be more fully understood from a consideration of the following detailed description of the preferred embodiment, taken in conjunction with the accompanying figures, in which like reference characters refer to like elements throughout.

BRIEF DESCRIPTION OF THE FIGURES

FIG. 3 is a view partly in section, taken from line 3—3 of FIG. 2.

DETAILED DESCRIPTION OF THE PREFERRED EMBODIMENTS

Figure 1:
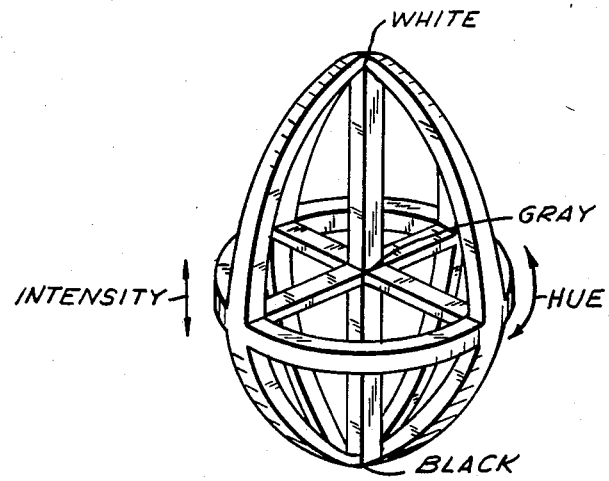
FIG. 1 is a depiction of one version of the so-called color solid.

FIG. 1 is a representation of one version of the so-called color solid, which illustrates the mehod of color analysis based on hue, saturation and intensity. It has been found particularly useful to adopt this representation of color in practicing the present invention. According to the scheme illustrated in FIG. 1, each of the several million colors discernible by the human eye is characterized by a unique combination of three parameters or variables. The hue can be thought of as the spectral color, i.e., the wave length of light having the desired appearance. The intensity, or brilliance, is a measure of the total amount of light reflected, or transmitted, as the case may be, by a unit area having the color in question, or the brightness of the color. The saturation indicates the degree by which the color differs from a grey of the same intensity.

Figure 2:
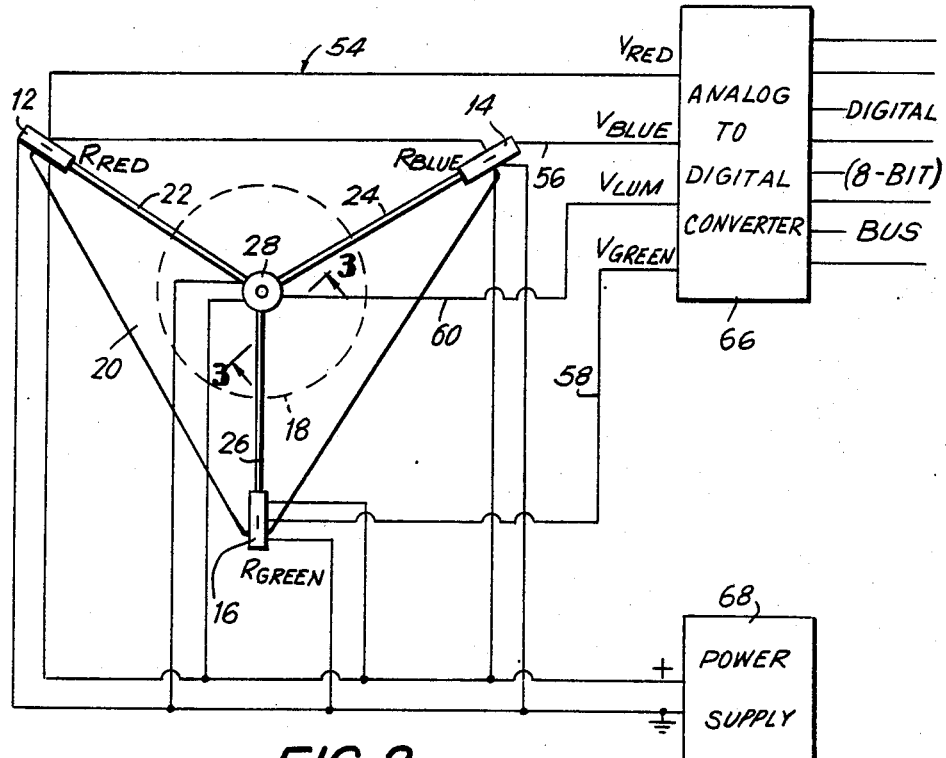
FIG. 2 is a plan veiw of the preferred embodiment of the invention.

FIGS. 2 and 3 illustrate one preferred embodiment of the invention. In this embodiment, three linear potentiomters 12, 14, 16, are disposed equiangularly about the perimeter of a circular region 18 which, in the embodiment shown, is the central portion of a triangular baseboard 20. Each potentiometer 12, 14, 16 is fixed to one end of a respective rod 22, 24, 26 whose other end is connected to the shaft of a rotary potentiometer 28. The slide 30 of each linear potentiometer 12, 14, 16 passes through a longitudinal slot 32 in the corresponding rod 22, 24, 26 and is rotatably received in a bronze bushing 34 whose lower end is secured in a hole 36 in the baseboard 20 and whose upper end has a horizontal flange 38 on which the rod 22, 24, 26 slidably rests. This arrangement permits each rod 22, 24, 26 to pivot in a horizontal plane about the bushing 34, and to slide along its own length on the bushing 34 within limits determined by the construction of the linear potentiometer 12, 14, 16.

The second end of each rod 22, 24, 26 has a through-hole 40, 42, 44 in which it rotatably receives the shaft 46 of the rotary potentiometer 28. A knob 48 is mounted on top of the shaft 46, to be manipulated by the graphics designer to select colors. Each rod 22, 24, 26 has a bore 50 receiving a jack 52 near its linear potentiometer 12, 14 or 16 through which the three leads 54, 56, 58 of the latter pass. Similarly the leads 60 for the rotary potentimeter 28 are kept conveniently out of the way by passing them through a jack 62 received in a bore 64 in rod 22 near the rotary potentiometer 28. The terminals of all four potentiometers are connected by their leads as shown to one or more ADC's collectively and schematically indicated by block 66, and to a power supply 68.

On the baseboard 20 is preferably provided a chart (not depicted) indicating th approximate colors associated with different portions of the circular region 18.

Movement of the knob 48 to different portions of the circular region 18 will change the voltages appearing at the terminals of the three linear potentiometers 12, 14, 16 in such a manner that the voltages will represent the knob position in region 18. These outputs, convert from analog to digital signals by the ADC 40, are supplied to a computer controlling the monitor or other video display in question (not shown) to select the hue and one other characteristic, preferably the saturation, of the color to be displayed. Preferably, the radial position of the knob 48 corresponds to the saturation, with saturation increasing with distance from the center of the circular region 18. The circumferential position of the knob 48 then corresponds to the hue.

To control the third characteristic (the intensity, in the preferred embodiment), the knob 48 is rotated to change the terminal voltages of the rotary potentiometer 28.

The exact transformations that must be effected on the outputs of the four potentiometers 12, 14, 16, 28 in order to convert the output voltages to signals that will provide the desired color depend on the color parameters represented by the knob's position in area 18. These transformations are believed to lie well within the ability of one skilled in the art of computer graphics hardware and software to carry out and will not be described.

As an alternative to the illustrated embodiment, the knob can be mounted in such a manner that one or more suitable transducer devices (analogous to the linear potentiometers in the embodiment described above) can sense not only the position of the knob in the circular region but also its altitude above some reference plane. For example, the knob can be mounted at the free end of a mechanical arm like that shown in "Computing in 3-D", *PC Magazine*, June, 1983, at page 350, and described in that article at pages 350–58. The contents of that article in their entirety are incorporated herein by reference. As disclosed in that article, the three-dimensional position of the free end of the arm can be monitored electronically. The rotary potentiometer is not necessary in this embodiment, since the altitude of the knob relative to the reference plane represents the third parameter.

As another variation of the illustrated embodiment, optical or sonic sensors can be used in place of the mechanical linkages and potentiometers to monitor the position of the knob. Such an embodiment is not preferred, because of its greater complexity and cost, but nonetheless lies within the bounds of the invention.

As another variant of the invention, the physical knob 48 and transducers 12, 14, 16, 28 can be replaced with a computer simulation of them. In this case, conventional control element, such as a joystick or video game paddle, capable of continuous movement in two geometric dimensions, is used to indicate to the computer the hue and saturation (or two other variables) of the desired color. Movement of the joystick off center in a particular direction causes the computer simulation of the "knob" to move in that direction from its previous location as long as the joystick is held off center. A push button or similar element at the end of the joystick can be used to control the third variable in a manner analagous to the control provided by rotation of the shaft of the rotary potentiometer 28 in the illustrated version.

The number of colors that can be chosen according to the invention is limited only by the precision with which the knob position can be represented by the signals produced by the potentiometers, or by the precision with which different directions of motion in the simulated circular region can be distinguished using the joystick or paddle.

In another variation, although not a preferred one, the third characteristic can be controlled by means of a number entered into a computer via the keyboard, in place of he rotary potentiometer. This, however, suffers from the same type of inconvenience as do current typical methods of color selection, although the degree of inconvenience is greatly reduced by the use of the analog selector to control the other two variables. This variant, nonetheless, is also within the scope of the invention.

As still another variation, variables other than hue, saturation and intensity can be represented by the knob's position and the setting of the rotary potentiometer. For example, any color can be produced additively from the three primaries red, blue and green. In theory, any three colors can be chosen as the three basic colors, or primaries, provided only that no one of the three colors can be produced as a combination of the other two. In practice particular frequencies of red, blue and green are almost always used as the primaries, since other choices can result in needing to use a negative amount of one of the chosen primaries to form a particular color. The invention can be practiced by using each coordinate (e.g., the setting of the rotary potentiometer, and two polar, cartesian or other coordinates representing position in the circular region) to represent the amount of a respective primary needed to produce the desired color. If cartesian coordinates, or other coordinates capable of asssuming negative values, are chosen, virturally any set of primaries can be used, although it is generally most convenient to use the primaries used by the video display unit in question.

One alternative choice of primaries that can be especially useful for applications in controlling colors for printing is to use a set of subtractive primaries such as cyan, magenta and yellow. It is convenient to let the distance of the control knob from a given one the linear potentiometers represent the amount of the the corresponding primary and the rotational setting of the rotary potentiometer represent the amount of black.

In addition, the color selector of the invention can be used as a control device for varying the color(s) of an entire video display, e.g., controlling the color of a television picture. The color selection can be used in this way to replace conventional color controls on television sets.

Although several preferred embodiments of the invention have been described for purposes of illustration, many modications and variations thereof will now be apparent to those skilled in the art. Accordingly, the scope of the invention is to be limited, not by the details of the embodiments described, but only by the terms of the appended claims.

What is claimed is:

1. An analog color selector for connection to a video display for selection among colors defined by a continuum of values of each of three selected independent variables and having a capability of instantaneous on-screen color selection at any specific location on a screen of the video display, said selector comprising a control element capable of being moved throughout a predetermined region, said region having at least two geometric dimensions, and a plurality of generating means connected to said control element for generating electrical signals representative of electrical signal an instantaneous position of said control element within said region, with each electrical signal generating means being capable of varying the value of the electrical signal produced based upon movement of the control element within said region, and with each position of said control element within said region being indicative of at least a first and a second independent variable of a specific color capable of being presented at a specific location on the screen of the video display.

2. An analog color selector for connection to a video display for selection among colors defined by a continuum of values of each of three selected independent variables and having a capability of instantaneous on-screen color selection at any specific location on a screen of the video display, said selector comprising a control element capable of being moved throughout a predetermined region, the region having at least two geometric dimensions, and a plurality of optical means for generating electrical signals representative of an instantaneous position of the control element within the region, with each optical means capable of varying the value of the electrical signal produced based upon movement of the control element within the region, and with each position of the control element within the region being indicative of at least a first and a second independent variable of a specific color capable of being presented on the screen of the video display.

3. An analog color selector for connection to a video display for selection among colors defined by a continuum of values of each of three selected independent variables and having a capability of instantaneous on-screen color selection at specific location on a screen of the video display, said selector comprising an electronic computer capable of defining a simulated region having at least two geometric dimensions and generating a plurality of electrical signals indicative of each of a plurality of locations within the simulated region, and a control element with means connected to the electronic computer for controlling the selection of specific locations within the simulated region, with movement of the control element causing selection of different specific locations within the simulated region, whereby the electronic computer is capable of varying the value of the electrical signals produced based upon movement of the control element within the simulated region and the plurality of electrical signals generated by the electronic computer at each specific location within the simulated region being indicative of at least a first and a second independent variable of a specific color capable of being presented at specific location on the screen of the video display.

4. The analog color selector of claim 1, wherein said plurality of electrical signal generating means are for generating analog signals representative of said control element position.

5. The analog color selector of claim 4 further comprising analog-to-digital converter means for converting said analog signals into digital signals.

6. The analog color selector of claim 1, wherein said region is two-dimensional and said position of said control element represents two of said independent variables.

7. The analog color selector of claim 6, further comprising an additional electrical signal generating means for generating an additional electrical signal representative of a chosen value of a third independent variable, with said control element controlling the value of said third independent variable.

8. The analog color selector of claim 7, wherein the additional electrical signal generating means for generating the additional electrical signal representative of a chosen value of the third independent variable includes a rotary potentiometer, with said control element being adapted to control the setting of said rotary potentiometer.

9. The analog color selector of claim 6, wherein said plurality of electrical signal generating means comprise at least two linear potentiometers with each having a slide element connected to said control element so that movement of said control element in said region will simultaneously vary the setting of at least one of said slide elements to control the value of the electrical signal produced by the corresponding potentiometer.

10. The analog color selector of claim 9 wherein said plurality of electrical signal generating means comprises three such linear potentiometers connected to said control element.

11. The analog color selector of claim 1 wherein said region has three geometric dimensions and said position of said control element in said region determines the values of all three of said independent variables.

12. The analog color selector of claim 1, further comprising visual means overlaying said region indicating approximately the colors that correspond to specific locations throughout said region.

13. The analog color selector of claim 3 wherein said controlling device is a joystick.

* * * * *

UNITED STATES PATENT AND TRADEMARK OFFICE
CERTIFICATE OF CORRECTION

PATENT NO. : 4,695,832

DATED : Sep. 22, 1987

INVENTOR(S) : Dov Jacobson

It is certified that error appears in the above-identified patent and that said Letters Patent is hereby corrected as shown below:

Column 1, line 33: "anoher" should be --another--

Column 2, line 33: "poentiometers" should be --potentiometers--

Column 2, line 59: "veiw" should be --view--

Column 2, line 67: "mehod" should be --method--

Column 3, line 15-16: "potentiomters" should be --potentiometers--

Column 3, line 40-41: "potentimeter" should be --potentiometer--

Column 3, line 49: "th" should be --the--

Column 3, line 55: "convert" should be --converted--

Column 4, line 58: "he" should be --the--

Column 5, line 24: delete "the" third occurrence

UNITED STATES PATENT AND TRADEMARK OFFICE
CERTIFICATE OF CORRECTION

PATENT NO. : 4,695,832

DATED : Sep. 22, 1987

INVENTOR(S) : Dov Jacobson

It is certified that error appears in the above-identified patent and that said Letters Patent is hereby corrected as shown below:

Column 5, line 49: after "of" insert --electrical signal--

Column 6, line 44-45: "varibales" should be --variables--

Signed and Sealed this

Twenty-second Day of March, 1988

Attest:

DONALD J. QUIGG

*Attesting Officer*   *Commissioner of Patents and Trademarks*